US010520111B2

(12) United States Patent
Taylor

(10) Patent No.: US 10,520,111 B2
(45) Date of Patent: Dec. 31, 2019

(54) SYSTEM AND METHOD FOR STRAIGHTENING UNDERGROUND PIPES

(71) Applicant: Airlift Concrete Experts, LLC, Alexander, AR (US)

(72) Inventor: Mike Taylor, Alexander, AR (US)

(*) Notice: Subject to any disclaimer, the term of this patent is extended or adjusted under 35 U.S.C. 154(b) by 0 days.

(21) Appl. No.: 15/997,145

(22) Filed: Jun. 4, 2018

(65) Prior Publication Data

US 2019/0368634 A1    Dec. 5, 2019

(51) Int. Cl.
*F16L 1/024* (2006.01)
*F16L 1/06* (2006.01)

(52) U.S. Cl.
CPC ..................... *F16L 1/06* (2013.01)

(58) Field of Classification Search
CPC ........................................................ F06L 1/06
See application file for complete search history.

(56) References Cited

U.S. PATENT DOCUMENTS

| | | | | |
|---|---|---|---|---|
| 3,568,455 A | * | 3/1971 | McLaughlin | ............. E03F 3/06 138/105 |
| 3,985,688 A | | 10/1976 | Speech | |
| 4,090,686 A | * | 5/1978 | Yarbrough | ................. F16L 1/10 138/105 |
| 4,116,011 A | | 9/1978 | Girault | |
| 4,567,708 A | | 2/1986 | Haekkinen | |
| 4,758,295 A | | 7/1988 | Sawaide et al. | |
| 5,229,453 A | | 7/1993 | Roberts | |
| 5,836,390 A | * | 11/1998 | Apps | ...................... C09K 17/12 166/281 |
| 6,250,847 B1 | * | 6/2001 | Bingham, Jr. | ........ F16L 3/1211 138/106 |
| 6,634,831 B2 | | 10/2003 | Canteri | |
| 7,135,087 B2 | | 11/2006 | Blackmore et al. | |
| 7,371,031 B1 | * | 5/2008 | Grimmett | ................. E03F 3/06 138/97 |
| 7,461,997 B1 | * | 12/2008 | Mack, II | ................. E01C 23/10 404/101 |

(Continued)

*Primary Examiner* — Benjamin F Fiorello
(74) *Attorney, Agent, or Firm* — Joe D. Calhoun

(57) ABSTRACT

A system for straightening downwardly-bowed underground pipeline using a means of pumping expandable fluid into substratum below the pipeline bow. The system includes an apparatus for identifying the bowed section of underground pipeline, and a device for delivering expandable liquid to the target site beneath the pipeline bow. The apparatus includes a frame supporting a series of probe-rods driven into contact with the top of the pipeline, to locate the bowed section. The device for straightening downwardly-bowed underground pipeline uses a means of pumping expandable fluid into substratum below the pipeline bow; the device comprises an elongated shaft having a trailing end and a leading end and defining a fluid pathway from the upstream trailing end to the downstream leading end. The trailing end is adapted to secure fluid communication between the fluid pathway and the means of pumping expandable fluid, and the fluid pathway terminates in at least one downstream fluid pathway exit; the leading end also including a means of shielding said pathway exit and diverting the fluid from continued downstream travel.

13 Claims, 8 Drawing Sheets

(56) References Cited

U.S. PATENT DOCUMENTS

| | | | |
|---|---|---|---|
| 7,517,177 B2* | 4/2009 | Erdemgil | E02D 3/12 405/229 |
| 7,789,591 B2 | 9/2010 | Hakkinen et al. | |
| 9,200,422 B2* | 12/2015 | Hakkinen | E02D 5/46 |
| 2006/0136070 A1 | 6/2006 | Pinchuk | |
| 2006/0275087 A1* | 12/2006 | Trout | E01C 23/10 405/267 |
| 2007/0031195 A1 | 2/2007 | Canteri | |
| 2011/0000567 A1 | 1/2011 | Iwasaki-Higbee | |
| 2013/0129423 A1* | 5/2013 | Hakkinen | E02D 27/34 405/128.7 |
| 2015/0132064 A1* | 5/2015 | Pirtle | F16L 1/028 405/184.1 |
| 2016/0102782 A1* | 4/2016 | Wang | F16L 55/175 405/184.1 |
| 2016/0168819 A1 | 6/2016 | Pastor et al. | |
| 2016/0326759 A1 | 11/2016 | Huh | |
| 2017/0073919 A1 | 3/2017 | Barron et al. | |

* cited by examiner

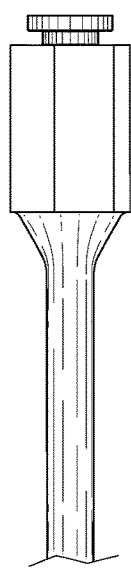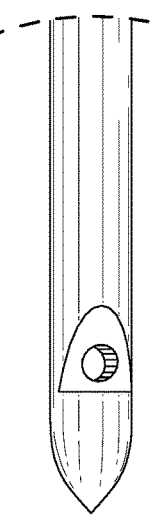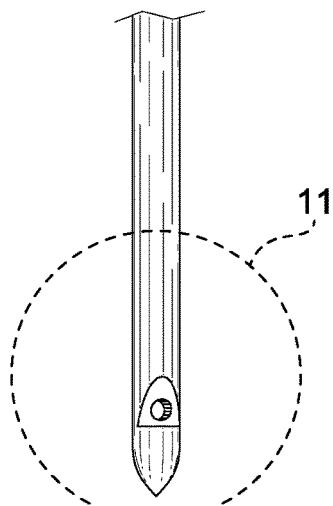
FIG. 10
FIG. 11
FIG. 12

SYSTEM AND METHOD FOR STRAIGHTENING UNDERGROUND PIPES

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION

(1) Field of the Invention

The present invention relates to systems and methods for straightening pipes buried underground. More particularly, the invention disclosed herein relates to the use of expandable liquids, such as foam-producing liquids, to expand into cavities and less-dense areas of soil beneath a bowed pipeline for the purpose of raising the pipeline until it is no longer bowed. The invention disclosed herein also relates to systems functioning to show the amount of bowing of an underground pipeline, without excavation.

(2) Background of the Invention

Known in the field are foam producing liquids used to enhance soil support. For example, U.S. Pat. No. 4,567,708 issued to Haekkinen discloses a method of levelling sunken portions of earth-supported floors or slabs, wherein holes are made in the floor through which polyurethane foam is pumped between the floor and the underlying earth; expansion of the foam creates pressure, which raises the sunken part of the floor.

U.S. Pat. No. 6,634,831 issued to Canteri discloses a method for increasing the bearing capacity of foundation soils for built structures, consisting of drilling holes spaced from each other deep in the soil, and injecting into the holes a substance which expands as a consequence of a chemical reaction, with a potential increase in volume of at least five times the volume of the substance before expansion. The expansion of the substance injected into the soil produces compaction of the contiguous soil, reinforce the foundation of the structure.

U.S. Pat. No. 7,135,087 issued to Blackmore discloses an apparatus and method for eliminating ground water infiltration while stabilizing the ground and repairing underground pipe/conduit and connections. The steps are to first inject expandable structural foam in the space adjacent and outside the pipeline while blocking any infiltration of the foam into the interior of the pipe, conduit or connection. Concurrently or separately, the inside diameter of the pipe receives structural repair by an inflatable bladder pressing a repair patch against the interior needing repair.

U.S. Patent Application Publication No. 2007/0031,195 of Canteri discloses a method for increasing the strength of a soil for supporting excavation faces, which comprises at least one reinforcement step that consists in boring spaced reinforcement holes arranged substantially vertically or inclined with respect to a vertical direction in the soil to be strengthened; reinforcement elements are then inserted in the reinforcement holes and are locked within the soil by injecting in the reinforcement holes a synthetic locking substance (such as polyurethane) that expands by chemical reaction and bonds the reinforcement elements with the soil.

None of the known prior art discloses a system for visualizing the bowed section of an underground pipeline, while also providing guidance limiting the upward movement of the pipeline and providing the means of elevating the pipeline without substantial excavation.

SUMMARY OF THE INVENTION

In general, the invention disclosed herein includes (comprises) an apparatus for deploying a method for un-bowing underground plumbing pipelines, conduits, or similar fluid-carrying structures, without excavation. In other words, the disclosed invention is essentially a method for elevating/straightening a pipeline buried beneath a structure, which has become bowed downwardly due to settling of foundational soil or other substratum; the invention may also include an apparatus facilitating the method.

Typically the bowed section of a pipeline may be determined using a drone/robot or similar device capable of traveling within the pipeline and transmitting information concerning the environment within the pipeline (such as a view of water standing within the pipeline). Knowledge of the location of the bowed section of the pipeline will enable the person using the Invention to position a pair of probes showing the bowed section between the probes. Even without prior knowledge of precise location of the bowed section of pipeline, the repairman may drill a series of bores into the substratum directly above the pipeline, until close to the top of the pipeline; a separate equal-length probe is inserted into each bore and pushed into contact with the top of the pipeline, to determine where the pipeline is bowed, and how much. The first and last probes in the alignment will mark where the pipeline is unbowed; when the tips of the intermediate probes are aligned in an essentially even gradient between the tips of the first and the last probes, the pipeline will have become unbowed.

One primary benefit of the disclosed invention is to provide a manner of visualizing the bowed section of underground pipeline.

Another benefit of the disclosed invention is to provide a manner of straightening bowed underground pipeline that does not require trenching or otherwise uncovering the pipeline.

Another benefit of the disclosed invention is to provide a manner of straightening bowed underground pipeline that is quicker and cheaper than traditional methods.

Another benefit of the disclosed invention is to provide a manner of raising the bow in an underground pipeline that does not result in straightening the bow higher than the sightline of the proper fall line of the pipeline.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages herein provided will become apparent to one with skill in the art upon examination of the accompanying Figures and detailed description. It is intended that all such additional systems, methods, features and advantages that are included within this description, be within the scope of any claims filed now or later.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings.

FIG. 10 depicts a perspective view of the bit in isolation.

FIG. 11 depicts a closeup of the subject matter encircled in FIG. 10.

FIG. 12 depicts a side elevation thereof after being rotated 90 degrees.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising", or "includes" and/or "including", or "have" or "having", when used in this specification, specify the presence of stated features, regions, integers, steps, operations, elements and/or components, but do not preclude the presence or addition of one or more other features, regions, integers, steps, operations, elements, components and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element. Likewise, synonyms for the same element, term or concept may be used only to distinguish one similar element from another, unless the context clearly indicates otherwise.

The disclosure herein is not limited by construction materials to the extent that other materials satisfy the structural and/or functional requirements. For example, any material may be used so long as it satisfies the rigid structural and functional needs. In one embodiment, the device and/or apparatus is constructed of steel material; however, any material of sufficient rigidity and durability will suffice as well. Likewise, the disclosed invention is not limited by any construction process or method.

In most general terms, the invention disclosed herein comprises (includes) a system for straightening downwardly-bowed underground pipeline using a means of pumping expandable fluid into substratum below the pipeline bow. The expandable fluid is almost always expandable liquid, sometimes a 2-part liquid that is mixed to produce the expansion. The system includes an apparatus for identifying the bowed section of underground pipeline, and a device for straightening downwardly-bowed underground pipeline using a means of pumping expandable fluid into substratum below the pipeline bow.

Figure 1:
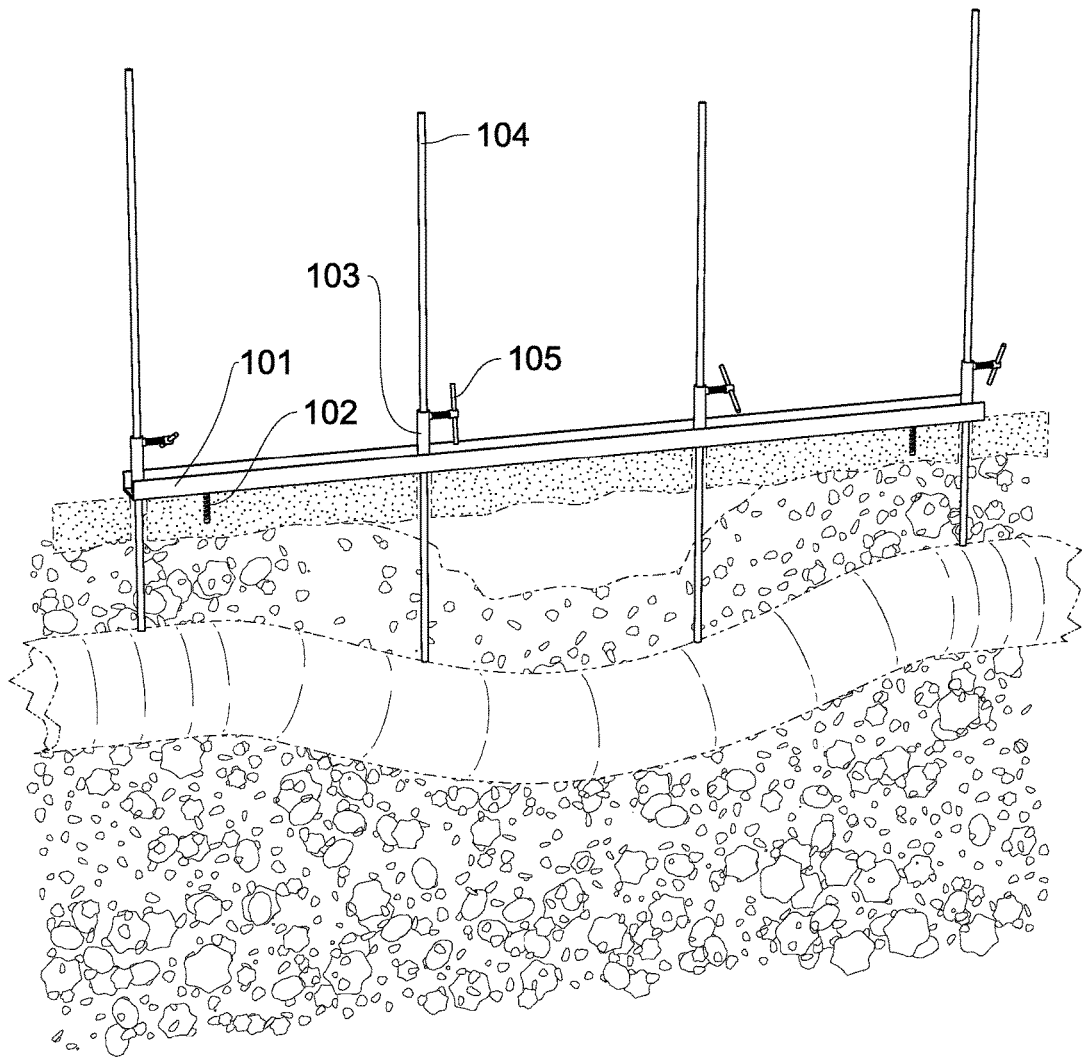
FIG. 1 depicts a representative sectional view showing the bowed underground pipeline beneath a concrete slab, with the probes positioned along the pipeline.
Figure 2:
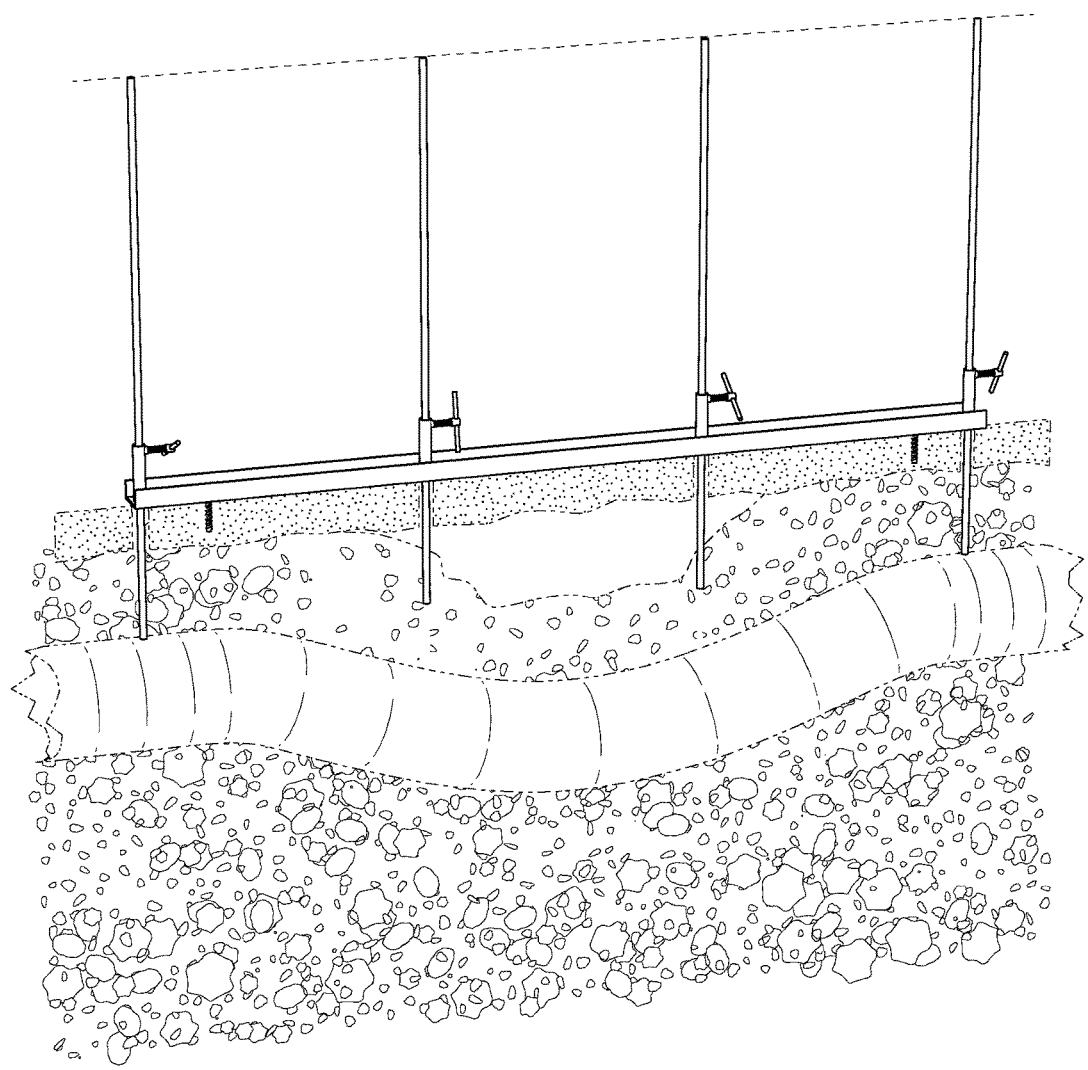
FIG. 2 depicts the same sectional view as FIG. 1, with the middle probes raised to the sight line between the tips of the end probes.
Figure 3:
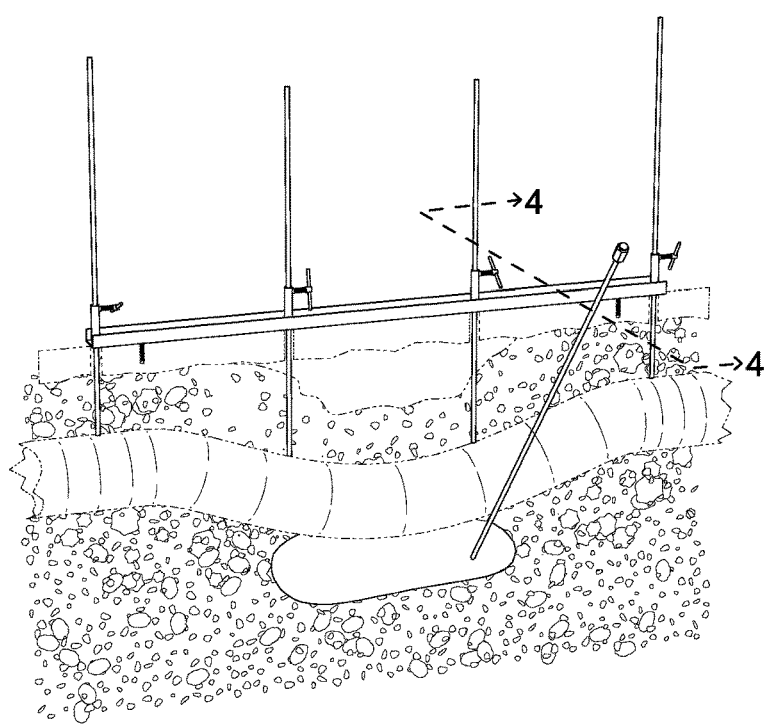
FIG. 3 depicts a sectional view showing the bowed underground pipeline beneath a concrete slab, with the probes positioned along the pipeline and with the bit (tip of the injection shaft) positioned beneath the center of the bow and injecting expandable foam.
Figure 4:
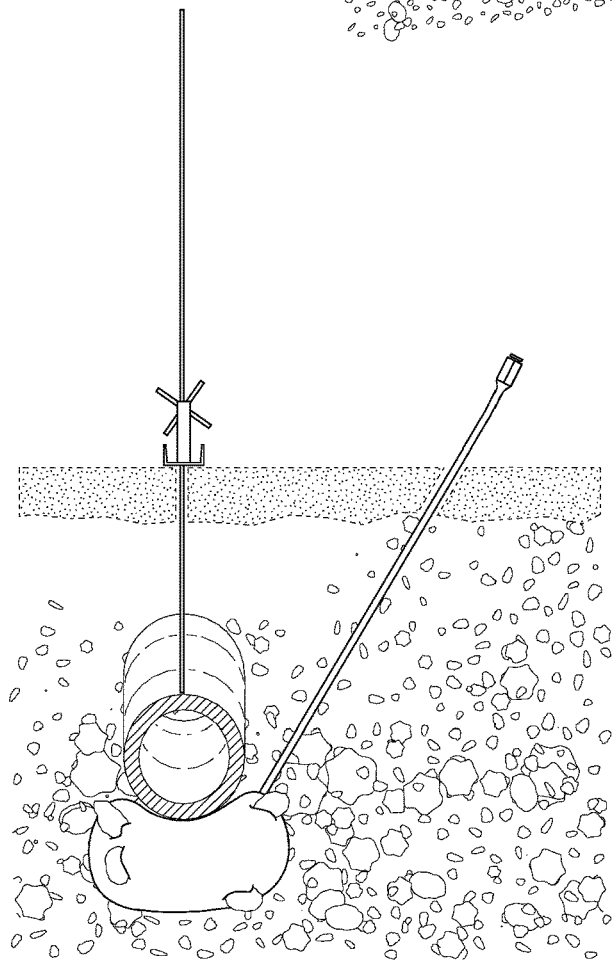
FIG. 4 depicts the sectional view plane 4-4 of FIG. 3.
Figure 5:
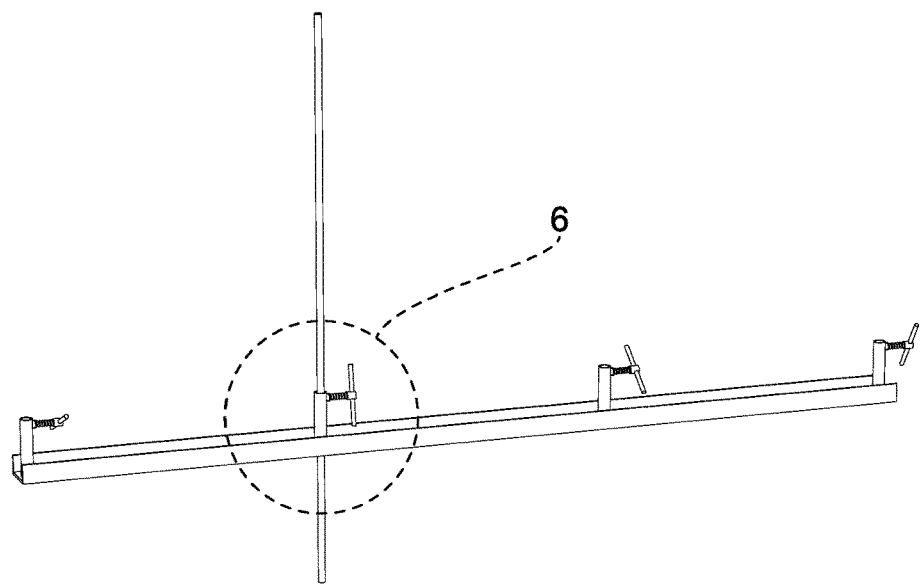
FIG. 5 depicts a perspective view of the probe frame in isolation, with one probe inserted.
Figure 6:
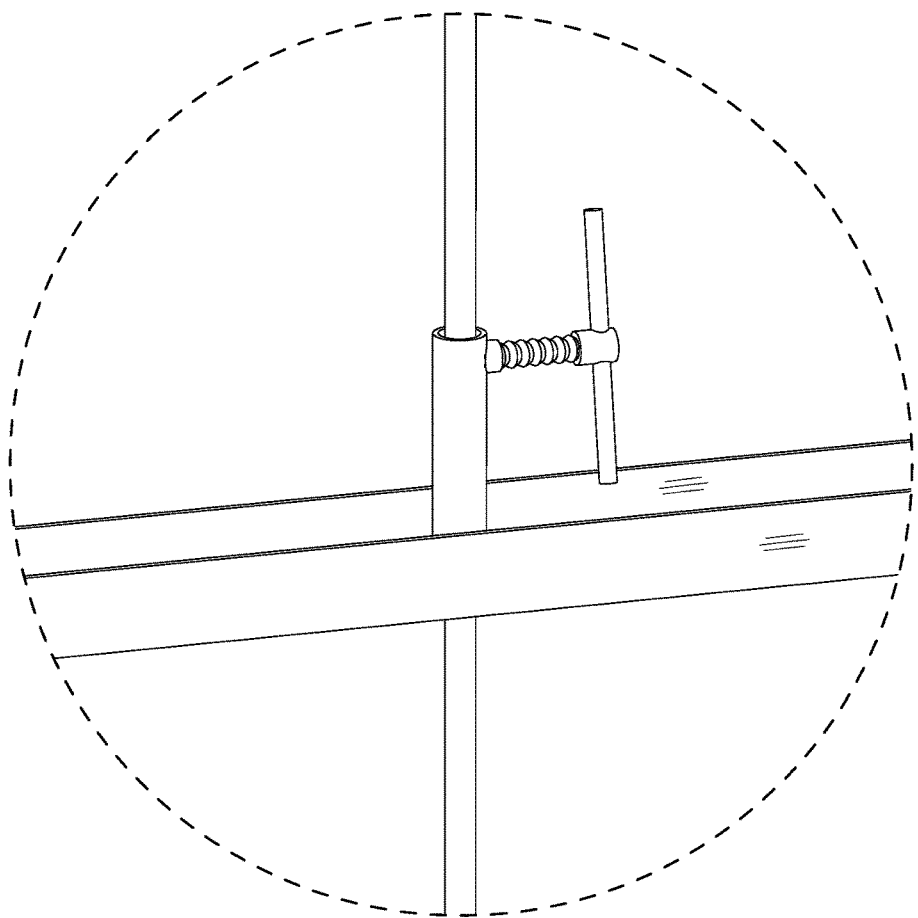
FIG. 6 depicts a closeup of the probe frame and probe tube and clamp, encircled in FIG. 4, showing the clamping of the probe.
Figure 7:
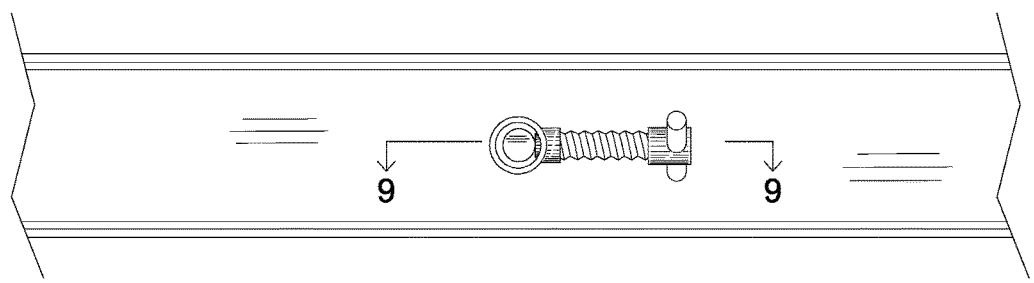
FIG. 7 depicts a top plan thereof.
Figure 8:
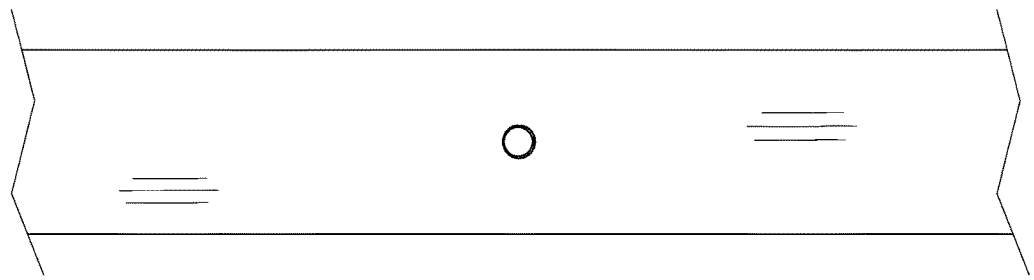
FIG. 8 depicts a bottom plan thereof.
Figure 9:
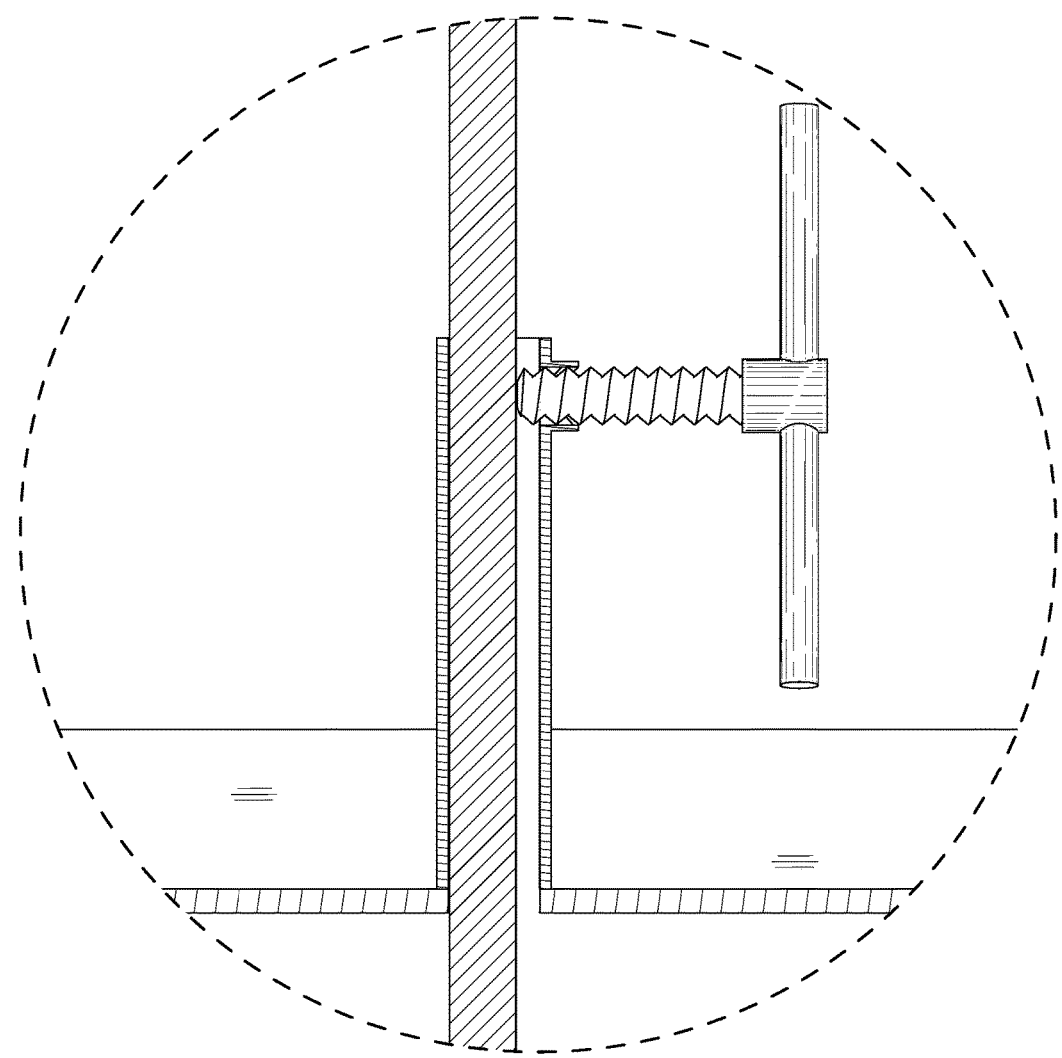
FIG. 9 depicts a closeup of the longitudinal cross-section along the plane 8-8 of FIG. 7.
Figure 13:
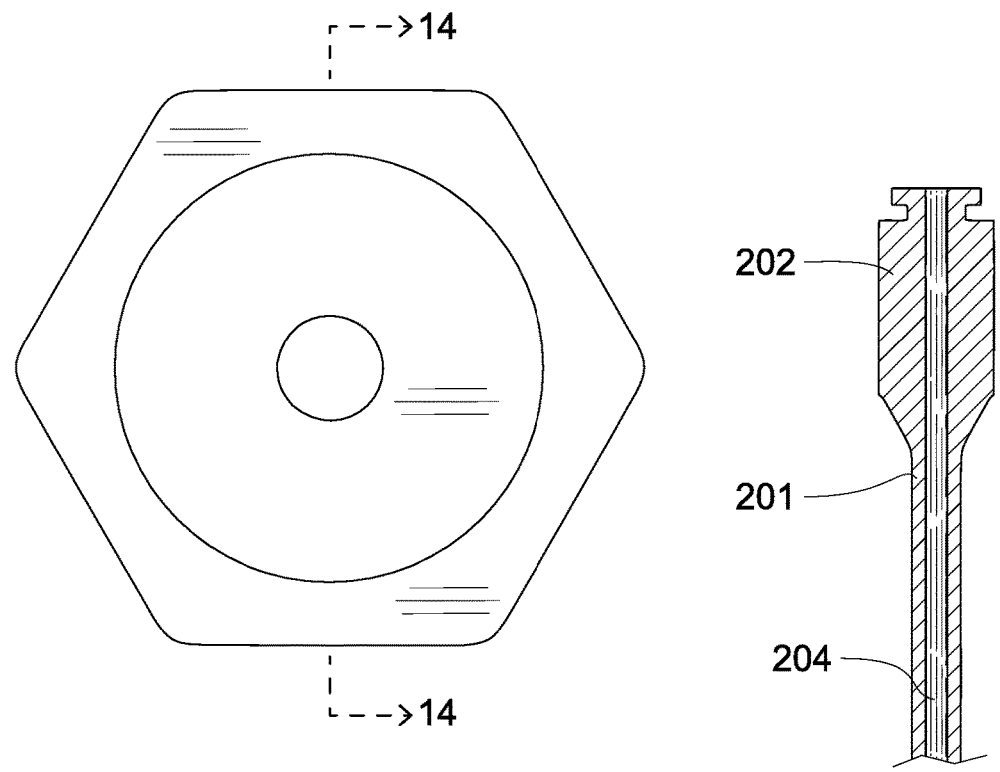
FIG. 13 depicts a closeup elevation view of the trailing end of the injection shaft.
Figure 14:
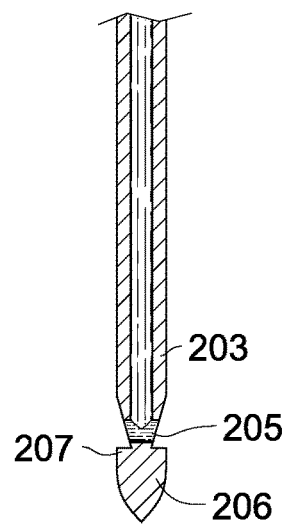
FIG. 14 depicts a longitudinal cross-section view of the bit, along the plane 14-14 of FIG. 13.

As shown in FIG. 1, the apparatus includes a frame supporting a series of probe-rods driven into contact with the top of the pipeline, to locate the bowed section. The first and last equal-length probe-rods in the series are typically aligned directly atop the pipeline, before and after the bowing; the intermediate equal-length probe-rod(s) are therefore positioned in the bowed segment of pipeline, so that the depth they are driven into the ground and into contact with the top of the pipeline (as indicated by the height of each's upper tip) indicates the depth of bowing.

Ideally the probe-rods are aligned and supported by a frame for anchoring to the slab or other substratum directly above the underground pipeline. One preferred frame includes an elongate U-channel (101) having apertures accommodating anchor bolts or anchor screws (102). Within the upright walls of the U-channel are tubes (103) attached to the floor of the U-channel, oriented vertically and aligned atop apertures in the floor to allow a probe-rod (104) to be driven through the frame and into contact with the top of the underground pipeline.

The frame also functions to stop the pipeline from being raised higher than it should be raised. Since underground pipeline usually is installed with one end lower than the other end, to allow gravity flow for the internal fluid, the bowed pipeline should only be un-bowed sufficiently to return it to its originally intended orientation within that pipeline "fall". When both end probe-rods are driven into contact with the top of the pipeline before and after the bowed section, the is a sight line between their upper tips that mirrors the pipeline fall. The passthrough tubes supporting the probe-rods also include a clamping mechanism (105) to prevent the rod from being raised further; and when the upper tips of the intermediate probe-rod(s) are raised to be adjacent to the sight line between the upper tops of the end probe-rods, the clamp can be tightened over each so that the probe-rod(s) will obstruct the pipeline from being raised higher after coming into contact with the lower tip of each probe-rod.

The device for straightening downwardly-bowed underground pipeline connects with a means of pumping expandable fluid into substratum below the pipeline bow. There are several injection pumps known in the field. The device comprises an elongated shaft (201) having a trailing end (202) and a leading end (203) and defining a fluid pathway (204) from the upstream trailing end to the downstream leading end. The trailing end is adapted to secure fluid communication between the fluid pathway and the means of pumping expandable fluid, and the fluid pathway terminates in at least one downstream fluid pathway exit (205). The leading end also includes a means of shielding said pathway exit and diverting the fluid from continued downstream travel.

To accomplish the un-bowing, additional bores will be drilled through the concrete slab (or other substratum) and into the soil to beside and below the bowed section of pipeline. Preferably the bores will be drilled diagonally to beneath the bowed section of the pipeline, starting up to about 36 inches beside the point where the pipeline would be located atop the ground. An injection shaft or similar conduit will be inserted into one or more bores (as needed), at least until the leading end of the injection shaft is positioned at or near the target area beneath the bowed section. Alternatively, a sleeve or other conduit may be inserted into the bore, and the injection shaft inserted through it until close to the target area. Expanding substance(s) will be injected through each tube and deposited in the target area; it is typically an expanding polyurethane injected into the beneath-pipeline soil. The amount of bowing will determine the amount of expanding substance(s) to inject beneath the pipeline. When sufficient expanding substance has been injected beneath the bowed section of the pipeline, its expansion will un-bow the pipeline. Clamping the intermediate probes at the appropriate level of un-bowing may also facilitate stopping un-bowing at the appropriate level.

In general, the invention disclosed herein includes a device for straightening downwardly-bowed underground pipeline using a means of pumping expandable fluid into substratum below the pipeline bow. The device preferably includes an elongated shaft, which is typically cylindrical. The shaft may include a trailing end and a leading end, and define a fluid pathway from the upstream trailing end to the downstream leading end. The trailing end preferably is adapted to secure fluid communication between the fluid pathway and the means of pumping expandable fluid. The fluid pathway may terminate in at least one downstream fluid pathway exit. The leading end further may include a means of shielding the pathway exit and diverting the fluid from continued downstream travel.

The leading end may include a tip (206) converging to a point having sufficient durability to pierce the ground or other substratum en route to positioning directly beneath the bowed section of the underground pipeline. Preferably, the fluid pathway may terminate in a plurality of lateral fluid pathway exits, each associated with a corresponding means of shielding the lateral pathway exit. In one preferred embodiment, the fluid pathway terminates in a first lateral fluid pathway exit and a second lateral fluid pathway exit on the opposite side of the shaft. In other embodiments, the lateral fluid pathway exits may be spaced periodically around the cylindrical shaft and/or spaced at varying distances from the tip of the downstream leading end of the shaft. The primary purpose of the shielding is to prevent or reduce clogging of the exits by dirt or other debris, while pushing the tip through the soil.

The means of shielding the lateral pathway exit may include, for each such exit, an overhang portion (207) of the shaft, cantilevering over the exit. One embodiment includes at least one of the lateral fluid pathway exits being essentially a notch cut near the tip, diagonally through the shaft and into the pathway, terminating downstream of the overhang portion. However, any means of shielding the exit(s) from substratum entry may suffice, so long as the structural durability and pierceability of the shaft is maintained, and so long as the fluid-flow function is maintained.

One specific embodiment includes (comprises) a device for straightening downwardly-bowed underground pipeline using a means of pumping expandable fluid into substratum below the pipeline bow, including an elongated shaft having a trailing end and a leading end and defining a fluid pathway from the upstream trailing end to the downstream leading end; the trailing end is adapted to secure fluid communication between the fluid pathway and the means of pumping expandable fluid, with the fluid pathway terminating in a first lateral fluid pathway exit and a second lateral fluid pathway exit on the opposite side of the shaft and, for each such exit, an overhang portion of the shaft cantilevering over the exit.

Besides the fluid-delivery device described herein, the disclosed invention includes a system for straightening downwardly-bowed underground pipeline using a means of pumping expandable fluid into substratum below the pipeline bow. Besides the fluid delivery device described herein, the system may include an apparatus for identifying the bowed section of underground pipeline; both the length of the bowing, and the degree of bowing, should be identified. The apparatus may include a first probe-rod driven vertically into the ground or substratum, into contact with the top of the pipeline; ideally this probe-rod will contact the middle of the top of the pipeline, immediately before the beginning of the bowed section. The apparatus may also include a second equal-length probe-rod vertically driven into contact with the top of the pipeline immediately after the ending of the bowed section. The first probe-rod has its upper tip exposed above the ground, and the second probe-rod has its upper tip exposed above the ground; since both probe-rods are of equal length, the difference between the elevation of the upper tips will reflect the correct amount of "fall" for the un-bowed portions of the pipeline. The sightline extending visually between both upper tips will reflect the desired amount of un-bowing of the bowed section of pipeline.

The apparatus further may include at least one equal-length intermediate probe-rod driven vertically into the ground until its upper tip is positioned on (adjacent) the fall sightline. The apparatus further may include a securing means for securing the intermediate probe-rod positioning for resisting upward movement of the pipeline. Although only a simple screw mechanism is depicted, the means for securing the intermediate probe-rod positioning may include functional equivalents.

The system further may include an elongated shaft may include a trailing end and a leading end and defining a fluid pathway from the upstream trailing end to the downstream leading end, the trailing end adapted to secure fluid communication between the fluid pathway and the means of pumping expandable fluid, the fluid pathway terminating in at least one downstream fluid pathway exit, the leading end may include a tip converging to a point, the leading end further may include a means of shielding the pathway exit and diverting the fluid from continued downstream travel.

The securing means may include an anchor plate anchored to the substratum and supporting a passthrough tube for each of the probe-rods driven into the substratum. For example, the securing means further may include, for each such passthrough tube, a clamp for clamping the probe-rod. The apparatus may include a plurality of intermediate probe-rods positioned within a respective passthrough tube by a respective clamp.

Besides the aforementioned apparatus and device, the invention disclosed herein includes a method of straightening underground pipeline between the beginning and ending of a downwardly bowed section thereof. The steps may include:

(a) anchoring, to the substratum directly above a bowed section of underground pipeline, an apparatus described above;

(b) driving, into the ground directly above the bowed section, a first probe-rod until contacting the top of the pipeline before the beginning of the bowed section, and a second equal-length probe-rod driven until contact with the top of the pipeline after the ending of the bowed section;

(c) determining the fall sightline between the upper tips of said first and second probe-rods;

(d) driving, into the ground between the first and second probe-rods, at least one equal-length intermediate probe-rod until contacting the top of the bowed pipeline, to reflect that amount of bowing;

(e) raising the intermediate probe-rod until its upper tip is situated on the fall line, then securing the intermediate probe-rod;

(f) driving, diagonally into the ground above and beside the pipeline bow, an elongated shaft comprising an upstream trailing end and a downstream leading end and defining a fluid pathway from the trailing end to the leading end, said trailing end securing fluid communication between the fluid pathway and the means of pumping expandable fluid, the fluid pathway terminating in at least one downstream fluid pathway exit at the leading end of the shaft driven to just beneath the pipeline bow; and (g) pumping expanding fluid through the pathway and out the exit(s) until the fluid expansion raises the pipeline until its top contacts the securely positioned intermediate probe-rod.

Optionally, step (d) may include driving, into the ground between the first and second probe-rods, a plurality of equal-length intermediate probe-rods until each's upper tip is situated on said fall line.

Optionally, step (f) may include driving, diagonally into the ground beside the pipeline bow, an elongated shaft comprising an upstream trailing end and a downstream leading end and defining a fluid pathway from the trailing end to the leading end, the trailing end securing fluid communication between the fluid pathway and the means of pumping expandable fluid, said fluid pathway terminating in a first lateral fluid pathway exit and a second lateral fluid pathway exit on the opposite side of the shaft and, for each such exit, an overhang portion of the shaft cantilevering over the exit to shield each exit from clogging.

Optionally, step (g) may include pumping a predetermined amount of expandable fluid having a predetermined expansion coefficient and predetermined expansion time, then awaiting said expansion time to determine whether further pumping is warranted.

Additional utilities and embodiments will be apparent to someone of ordinary skill in the art, after reviewing this disclosure.

I claim:

1. A device for straightening downwardly-bowed underground pipeline using a means of pumping expandable fluid into substratum below the pipeline bow, the device comprising an elongated shaft comprising a trailing end and a leading end and defining a fluid pathway from the upstream trailing end to the downstream leading end, said trailing end adapted to secure fluid communication between said fluid pathway and the means of pumping expandable fluid, said fluid pathway terminating in at least one downstream fluid pathway exit, said leading end further comprising a tip converging to a point leading an overhang portion of the leading end formed by reducing the thickness of the leading end before the fluid pathway exit, at least perpendicularly to the fluid pathway and without any thickening of the leading end between the fluid pathway exit and the point, thereby shielding the fluid pathway exit while the tip is being pushed down into the soil, and reducing clogging of the fluid pathway exit by dirt or other debris.

2. A device described in claim 1, said fluid pathway terminating in a plurality of lateral fluid pathway exits, each associated with an overhang portion of the leading end.

3. A device described in claim 2, said fluid pathway terminating in a first lateral fluid pathway exit and a second lateral fluid pathway exit on the opposite side of said shaft.

4. A device described in claim 2, at least one of said lateral fluid pathway exits comprising a notch cut diagonally downstream through said shaft and into said pathway, reducing the thickness of the shaft until terminating at said overhang portion of the leading end.

5. A device for straightening downwardly-bowed underground pipeline using a means of pumping expandable fluid into substratum below the pipeline bow, the device comprising an elongated shaft comprising a trailing end and a leading end and defining a fluid pathway from the upstream trailing end to the downstream leading end, said trailing end adapted to secure fluid communication between said fluid pathway and the means of pumping expandable fluid, said fluid pathway terminating in a first lateral fluid pathway exit and a second lateral fluid pathway exit on the opposite side of said shaft, said leading end comprising a tip converging to a point leading an overhang portion of the leading end formed by reducing the thickness of the leading end before each fluid pathway exit, at least perpendicularly to the fluid pathway and without any thickening of the leading end between the respective fluid pathway exit and the point, thereby shielding each respective fluid pathway exit while the tip is being pushed down into the soil, and reducing clogging of the respective fluid pathway exit by dirt or other debris.

6. A system for straightening downwardly-bowed underground pipeline using a means of pumping expandable fluid into substratum below the pipeline bow, the system comprising:

(a) an apparatus for identifying the bowed section of underground pipeline comprising a first probe-rod driven into contact with the top of the pipeline before the beginning of the bowed section and a second equal-length probe-rod driven into contact with the top of the pipeline after the ending of the bowed section, said first probe-rod having an upper tip and said second probe-rod having an upper tip, a fall sightline extending visually between both upper tips, said apparatus further comprising at least one equal-length intermediate probe-rod driven into the ground until its upper tip is positioned on the fall sightline, said apparatus further comprising a securing means for securing said intermediate probe-rod positioning for resisting upward movement of the pipeline; and (b) an elongated shaft comprising a trailing end and a leading end and defining a fluid pathway from the upstream trailing end to the downstream leading end, said trailing end adapted to secure fluid communication between said fluid pathway and the means of pumping expandable fluid, said fluid pathway terminating in at least one downstream fluid pathway exit, said leading end comprising a tip converging to a point, said leading end further comprising a means of shielding said pathway exit and diverting the fluid from continued downstream travel.

7. An apparatus described in claim 6, said securing means comprising an anchor plate anchored to the substratum and supporting a passthrough tube for each of said probe-rods driven into the substratum.

8. An apparatus described in claim 7, said securing means further comprising, for each such passthrough tube, a clamp for clamping said probe-rod.

9. An apparatus described in claim 8, said apparatus comprising a plurality of intermediate probe-rods positioned within a respective passthrough tube by a respective clamp.

10. A method of straightening underground pipeline between the beginning and ending of a downwardly bowed section thereof, comprising the steps of:

(a) Anchoring, to the substratum directly above a bowed section of underground pipeline, an apparatus described in claim 6 (a);

(b) driving, into the ground directly above the bowed section, a first probe-rod until contacting the top of the pipeline before the beginning of the bowed section and a second equal-length probe-rod driven until contact with the top of the pipeline after the ending of the bowed section;

(c) determining the fall sightline between the upper tips of said first and second probe-rods;

(d) driving, into the ground between said first and second probe-rods, at least one equal-length intermediate probe-rod until contacting the top of the bowed pipeline, to reflect that amount of bowing;

(e) raising the intermediate probe-rod until its upper tip is situated on said fall line, then securing said intermediate probe-rod;

(f) driving, diagonally into the ground above and beside the pipeline bow, an elongated shaft comprising an upstream trailing end and a downstream leading end and defining a fluid pathway from the trailing end to the leading end, said trailing end securing fluid communication between said fluid pathway and the means of pumping expandable fluid, said fluid pathway terminating in at least one downstream fluid pathway exit at the leading end of said shaft driven to just beneath the pipeline bow; and (g) pumping expanding fluid through said pathway and out said exit until said fluid expansion raises the pipeline until its top contacts the securely positioned intermediate probe-rod.

11. The method described in claim 10 wherein step (d) comprises driving, into the ground between said first and second probe-rods, a plurality of equal-length intermediate probe-rods until each's upper tip is situated on said fall line.

12. The method described in claim 10 wherein step (f) comprises driving, diagonally into the ground beside the pipeline bow, an elongated shaft comprising an upstream trailing end and a downstream leading end and defining a fluid pathway from the trailing end to the leading end, said trailing end securing fluid communication between said fluid pathway and the means of pumping expandable fluid, said fluid pathway terminating in a first lateral fluid pathway exit and a second lateral fluid pathway exit on the opposite side of said shaft and, for each such exit, an overhang portion of said shaft cantilevering over said exit.

13. The method described in claim 10 wherein step (g) comprises pumping a predetermined amount of expandable fluid having a predetermined expansion coefficient and predetermined expansion time, then awaiting said expansion time to determine whether further pumping is warranted.

* * * * *